United States Patent
Sanchez et al.

(10) Patent No.: US 9,934,479 B2
(45) Date of Patent: Apr. 3, 2018

(54) WELL PLANNING WORKFLOW SYSTEM, METHOD AND COMPUTER-PROGRAM PRODUCT

(71) Applicant: Landmark Graphics Corporation, Houston, TX (US)

(72) Inventors: Diego Fernando Sanchez, Cypress, TX (US); Jeffrey Miller, Houston, TX (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 485 days.

(21) Appl. No.: 14/423,098

(22) PCT Filed: Apr. 25, 2013

(86) PCT No.: PCT/US2013/038198
§ 371 (c)(1),
(2) Date: Feb. 20, 2015

(87) PCT Pub. No.: WO2014/031186
PCT Pub. Date: Feb. 27, 2014

(65) Prior Publication Data
US 2015/0220861 A1    Aug. 6, 2015

Related U.S. Application Data

(60) Provisional application No. 61/692,652, filed on Aug. 23, 2012.

(51) Int. Cl.
*G06G 7/48*     (2006.01)
*G06Q 10/06*    (2012.01)
*E21B 41/00*    (2006.01)
*E21B 47/00*    (2012.01)

(52) U.S. Cl.
CPC ..... *G06Q 10/0633* (2013.01); *E21B 41/0092* (2013.01); *E21B 47/00* (2013.01); *G06Q 10/06* (2013.01)

(58) Field of Classification Search
CPC .................................................. G06Q 10/0633
USPC .......................................................... 703/10
See application file for complete search history.

(56) References Cited

U.S. PATENT DOCUMENTS

| 7,548,873 B2 | 6/2009 | Veeningen et al. |
| 8,190,458 B2 | 5/2012 | Back et al. |
| 2007/0199721 A1 | 8/2007 | Givens et al. |
| 2011/0022435 A1 | 1/2011 | Reid et al. |

FOREIGN PATENT DOCUMENTS

| EA | 010708 B1 | 10/2008 |
| EA | 013660 B1 | 6/2010 |
| WO | WO-2014031186 A1 | 2/2014 |

OTHER PUBLICATIONS

Search Report and Written Opinion of the International Searching Authority; dated Aug. 2, 2013; 11 pages; U.S. International Searching Authority.
The Federal Institute of Industrial Property, Office Action, dated Sep. 5, 2016, 6 pages, Russia.
The Federal Institute of Industrial Property, Office Action, dated Sep. 5, 2016, 4 pages, English Translation, Russia.

*Primary Examiner* — Hugh Jones (57) ABSTRACT

A workflow management system that integrates well planning workflows with technical applications, audits change events, provides personnel authorizations, tracks and manages change events, and integrates best practice documentation and data at any point along the workflow.

27 Claims, 5 Drawing Sheets

WELL PLANNING WORKFLOW SYSTEM, METHOD AND COMPUTER-PROGRAM PRODUCT

PRIORITY

This application is a U.S. National Stage patent application of International Patent Application No. PCT/US2013/038198, filed on Apr. 25, 2013, which claims priority to U.S. Provisional Application No. 61/692,652 entitled, "WELL PLANNING WORKFLOW SYSTEM, METHOD & COMPUTER PROGRAM PRODUCT," filed Aug. 23, 2012, also naming Diego F. Sanchez et al. as inventors; the benefit of each of these applications is claimed and the disclosure of each of these applications is incorporated herein by reference in its entirety.

FIELD OF THE INVENTION

The present invention generally relates to the planning of hydrocarbon wells and, more specifically, to a system which executes and audits well planning workflows.

BACKGROUND

In light of the recent oil spill in the Gulf of Mexico, new compliance legislation is expected throughout the oil and gas industry. Thus, conformity with such legislation has become of increasing concern, especially since compliance may be the only avenue through which operations resume in the Gulf of Mexico. Current indications are that a new management control environment will be imposed that requires heightened record keeping and oversight throughout the well planning and completion stages.

Presently, however, there are no effective platforms to meet this need. Moreover, there is cause for concern for a number of other reasons. First, operators lack the experience in this changing environment. Second, well planning documentation is often difficult to locate and sometime never read. Third, current training methodologies are insufficient to cover all circumstances which might occur during planning of the well. Fourth, changes made during well planning are not currently tracked. Lastly, the knowledge attained by personnel during the well planning stage is often lost because there are no means by which to capture it.

Accordingly, in view of the foregoing shortcomings, there is a need in the art for a system which allows the collaborative planning, management and tracking of each step along a well planning workflow, thereby providing the necessary platform to meet the coming challenges in the industry.

DESCRIPTION OF ILLUSTRATIVE EMBODIMENTS

Illustrative embodiments and related methodologies of the present invention are described below as they might be employed in a system to execute and audit well planning workflows. In the interest of clarity, not all features of an actual implementation or methodology are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methodologies of the invention will become apparent from consideration of the following description and drawings.

Figure 1:
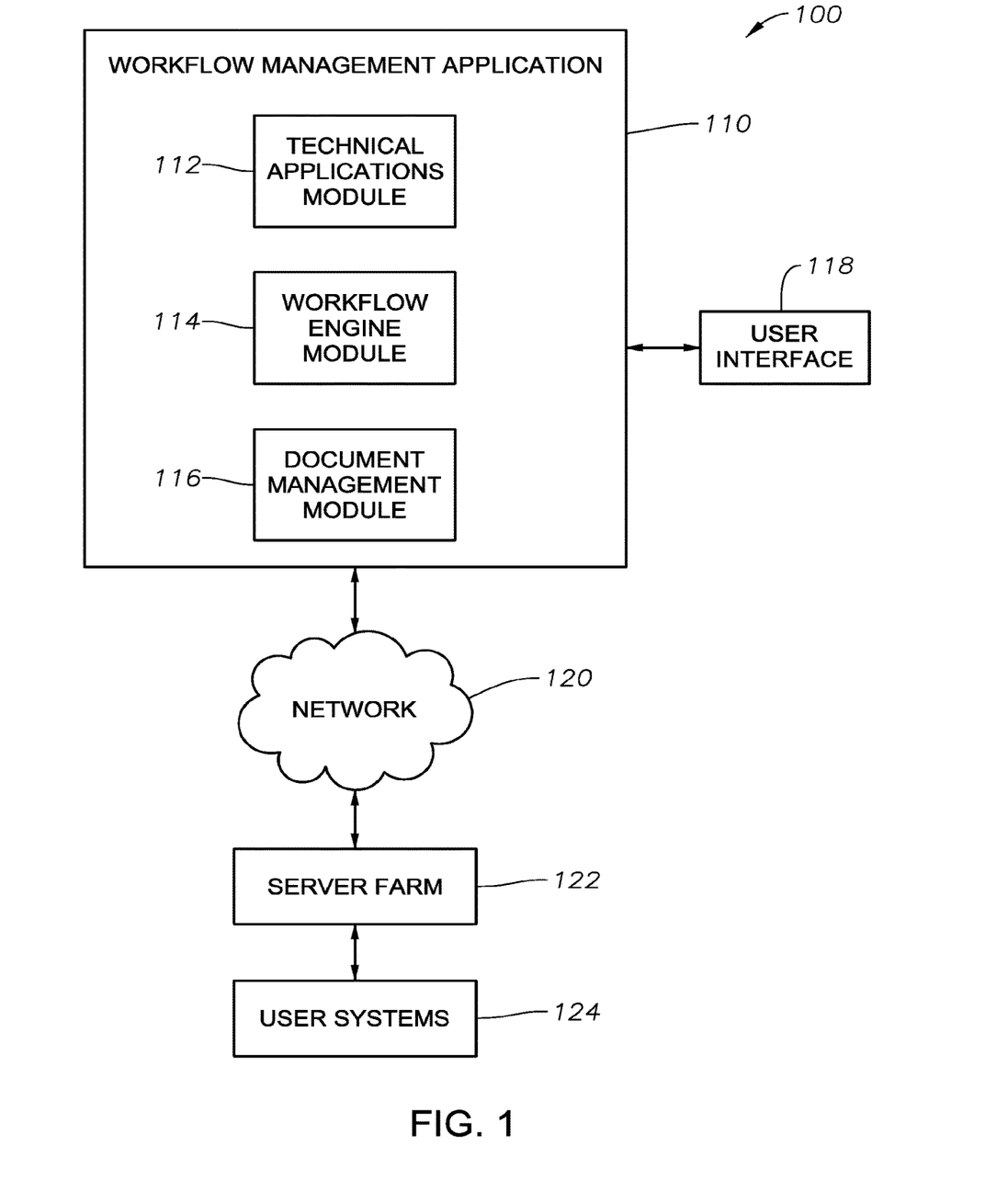
FIG. 1 illustrates a block diagram representing a workflow management system according to an exemplary embodiment of the present invention.

FIG. 1 shows a block diagram of workflow management system 100 according to an exemplary embodiment of the present invention. As will be described herein, workflow management system 100 integrates well planning workflows with industry standard technical applications (e.g., engineering modeling applications); provides audit trails of change events during drilling or as well designs are planned or altered; allows authorized personnel to approve well designs, construction and completions; tracks and manages deviations; and integrates document management systems to provide best practice documentation and related data at any point along the workflow. In addition, workflow management system 100 captures historical data for use in driving and understanding operations and decisions, as well as operating data in real-time.

In an exemplary embodiment, workflow management system 100 includes workflow management application 110 which comprises technical applications module 112, workflow engine module 114 and document management module 116. A user interface 118 is operably connected to workflow management application 110 in order to provide user interaction via a display and other necessary I/O devices. Although not shown, workflow management application 110 includes at least one processor to conduct the operations described herein, and may further include a non-transitory, computer-readable storage and transceiver/network communication module, all interconnected via a system bus, as would be understood by those ordinarily skilled in the art having the benefit of this disclosure. Moreover, software instructions executable by the processor for implementing software instructions stored within workflow management application 110 in accordance with the exemplary embodiments described herein, may be stored on the storage device or some other computer-readable medium.

In certain exemplary embodiment, technical applications module 112 comprises a comprehensive set of engineering tools for analysis, well planning, modeling and well operations optimization. Such engineering tools provide detailed operations and engineering workflows from prototype to plan and actual phases of drilling or servicing a well. Exemplary engineering tools embodied in technical applications module 112 may include, for example, the Engineer's Data Model™ or Engineer's Desktop™ application suite, both commercially offered through Landmark Graphics Corporation of Houston, Tex., the Assignee of the present invention. Workflow engine module 114 allows the creation and/or modification of the well design and/or workflow process. An exemplary workflow engine platform may be, for example, Casepoint® or some other suitable platform that provides solutions for building knowledge intensive workflows, as would be understood by those ordinarily skilled in the art having the benefit of this disclosure.

Document management module 116 provides the ability to integrate documentation into workflow management system 100 such as, for example, best practice documentation or technical journals relevant to the workflow. A variety of document management applications may be embodied in document management module 116 such as, for example, SharePoint® or other similar platforms that provide document and file management, system and process integration, workflow automation, etc. Accordingly, the exemplary embodiments of the present invention provide a well planning workflow tool that integrates engineering applications and best practice documentation at any point along the workflow process.

Workflow management application 110 further includes the application pools necessary to support workflow management system 100. Such applications include, for example, web applications, site collections, content databases, zones and load-balanced URLs. In addition, and as will be described in more detail below, workflow management system 110 also includes zone policies which determine user authorization levels. For example, certain users may be denied write access to workflow management system 100, while users having engineering or managerial positions are given certain write access based upon their level of authority and/or expertise within the well planning workflow process.

Still referring to FIG. 1, workflow management application 110 is connected to one or more public and/or private networks via appropriate network connection 120. As understood in the art, such network connections may include wired or wireless networks such as, for example, a wide area network, virtual private network or enterprise private network. It will also be recognized that the software instructions comprising the workflow management system 110 may also be loaded into the storage of workflow management system 110 from a CD-ROM or other appropriate storage media via wired or wireless means.

A server farm 122 is in communication with workflow management application 110 via network connection 120. As understood in the art, server farm 122 may include the necessary load balancers for workflow management system 100, front-end and application web servers, clustered or mirrored database servers (e.g., SQL server), as well as the web services application for document management module 116. In addition, the application web servers may also handle the web applications for the central administration site hosting workflow management system 100. All such functions would be understood by those ordinarily skilled in the art having the benefit of this disclosure.

End user systems 124 are in communication with server farm 122 via any appropriate network connection (not shown), such as those described herein. End user systems 124 will comprise all necessary hardware, software, local area networking capability, etc., to facilitate end user interaction with workflow management application 110. For example, end user system 124 may contain various zones and authentication levels for end users and an intranet application comprising a directory and network authentication protocol such as, for example, Kerberos or NTLM.

Figure 2:
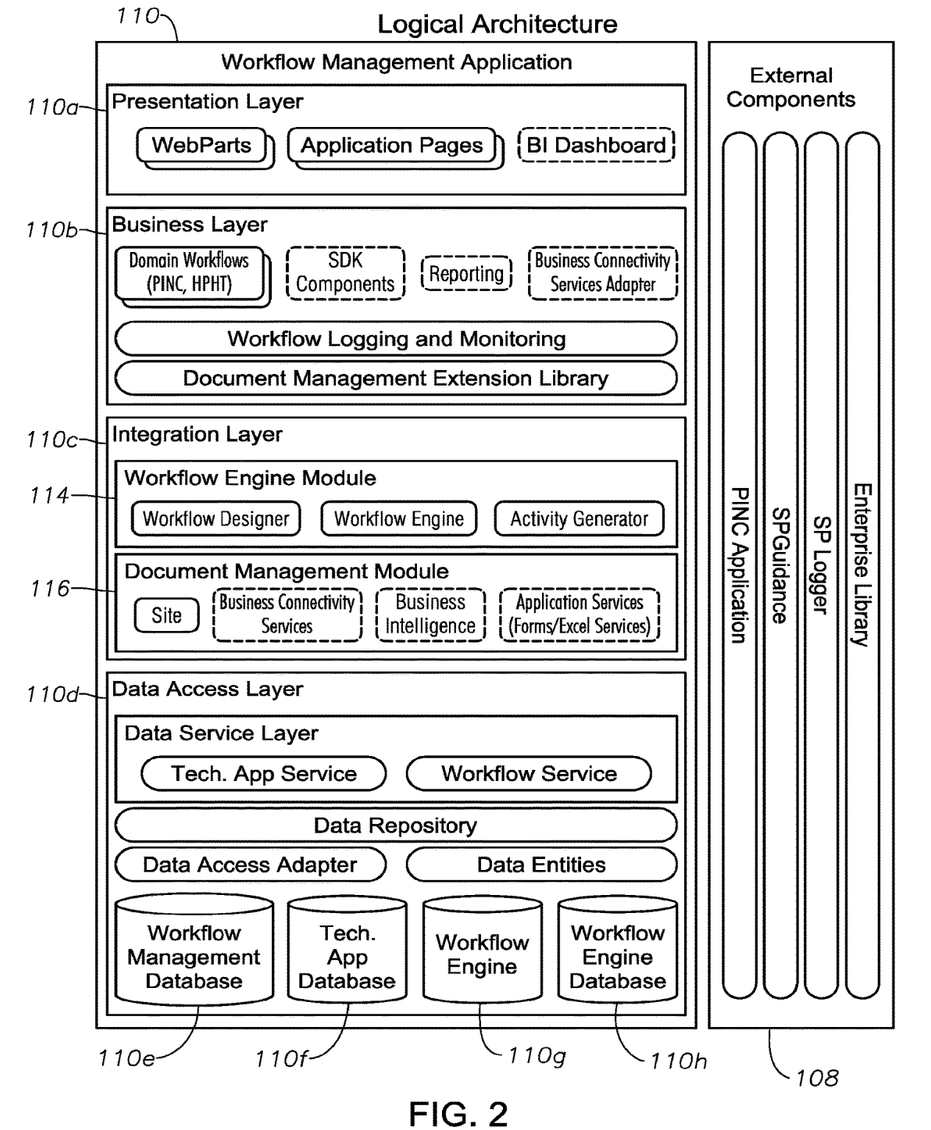
FIG. 2 illustrates a block diagram representing the logical architecture of a workflow management application utilized in accordance with an exemplary methodology of the present invention.

FIG. 2 illustrates a more detailed logical architecture of workflow management application 110 according to an exemplary embodiment of the present invention. Workflow management application 110 comprises a variety of layers such as, for example, presentation layer 110a, business layer 110b, integration layer 110c and data access layer 110d. As shown, presentation layer 110a comprises the necessary web parts, application pages and business intelligence ("BI") dashboard necessary for the user interface. Business layer 110b comprises domain workflows such as, for example, high pressure/high temperature or Potential Incident of Noncompliance ("PINC"), as defined by the Bureau of Energy Management, Regulation and Enforcement ("BOEMRE").

Business layer 110b further includes Software Development Kit ("SDK") components, reporting capability, a business connectivity services adapter, workflow logging and monitoring capability, and a document management extension library (e.g., SharePoint®). Integration layer 110c comprises workflow engine module 114 and document management module 116, as previously described. As shown, workflow engine module 114 comprises a workflow designer, workflow engine and activity generator. An exemplary workflow engine platform is Casepoint®, as would be understood by those ordinarily skilled in the art having the benefit of this disclosure.

Document management module 116 comprises site services, business connectivity services, business intelligence and application services (e.g., forms, EXCEL® services, etc.). Again, there are a variety of document management platforms that may be utilized by document management modules 116 such as, for example, SharePoint®. Data access layer 110d comprises a data services layer that embodies technical applications module 112, as previously described. The data services layer also comprises a workflow service in order to store and access data related to workflow engine module 114.

Data access layer 110d further comprises a data repository, data access adapter and data entities. Data access layer 110d also includes workflow management database 110e, data modeling database 110f, workflow engine database 110g and document management database 110h, to provide the necessary data storage and retrieval capability of their respective application modules. External components 108 are also operably connected to workflow management application 110 which comprises an enterprise library, logging and guidance applications such as, for example, SPLogger and SPGuidance, and a PINC application. Those ordinarily skilled in the art having the benefit of this disclosure realize the logical architecture described above is exemplary in nature and that other logic applications may be added as desired.

Figure 3A:
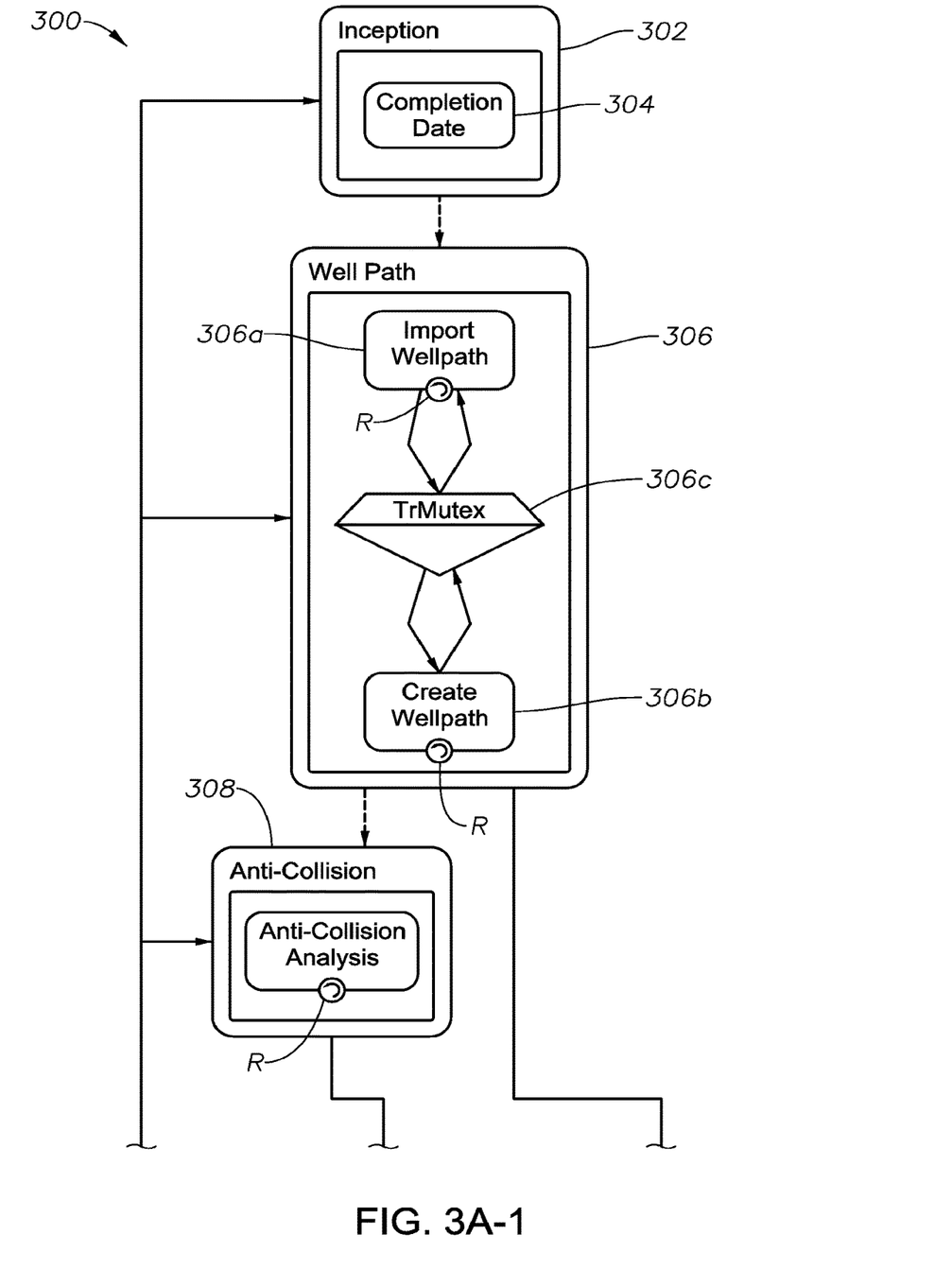
FIG. 3A is a flow chart illustrating steps of a well planning workflow according to an exemplary methodology of the present invention.
FIG. 3B illustrates a user interface according to an alternative exemplary embodiment of the present invention.
Figure 3A:
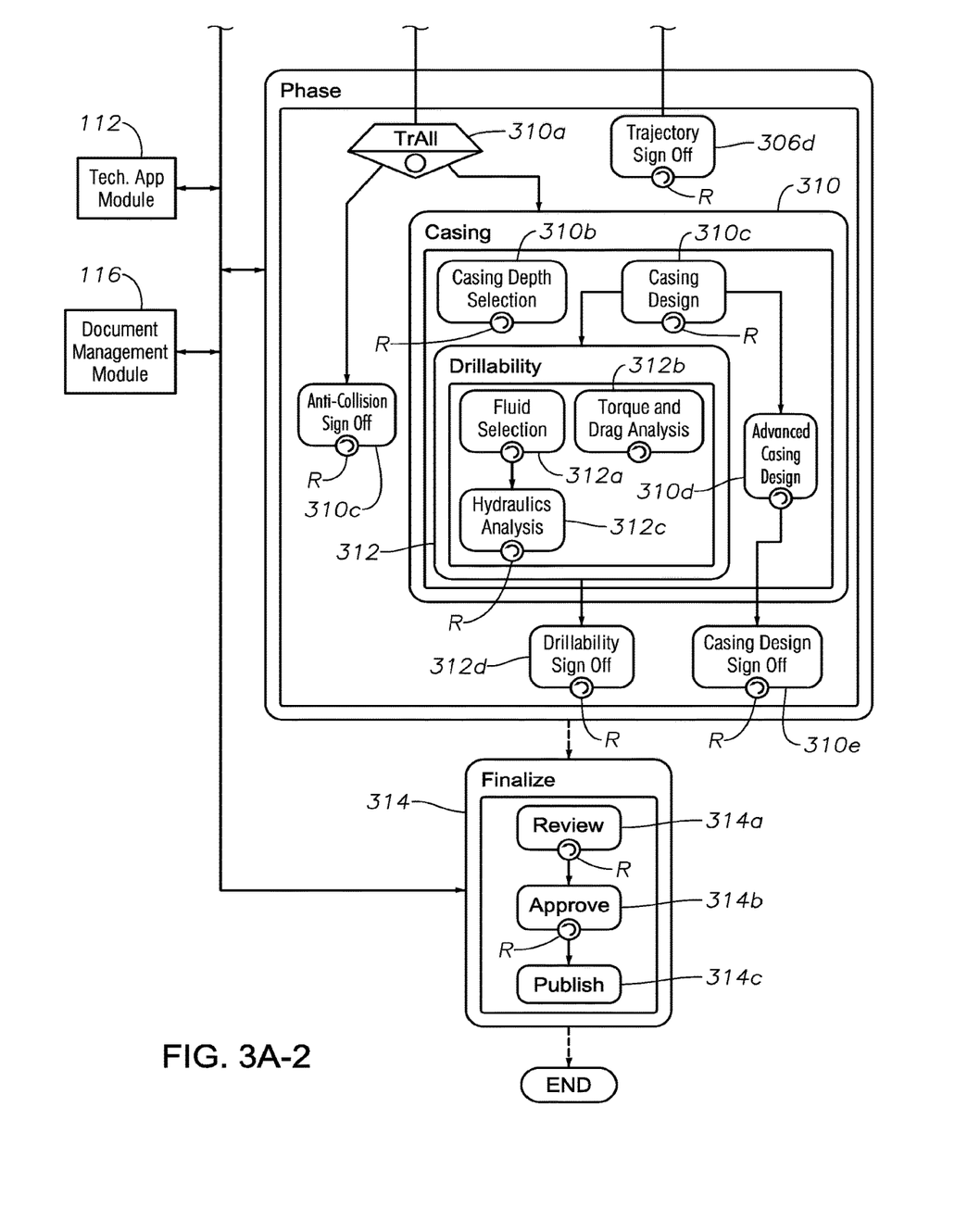
Figure 3B:
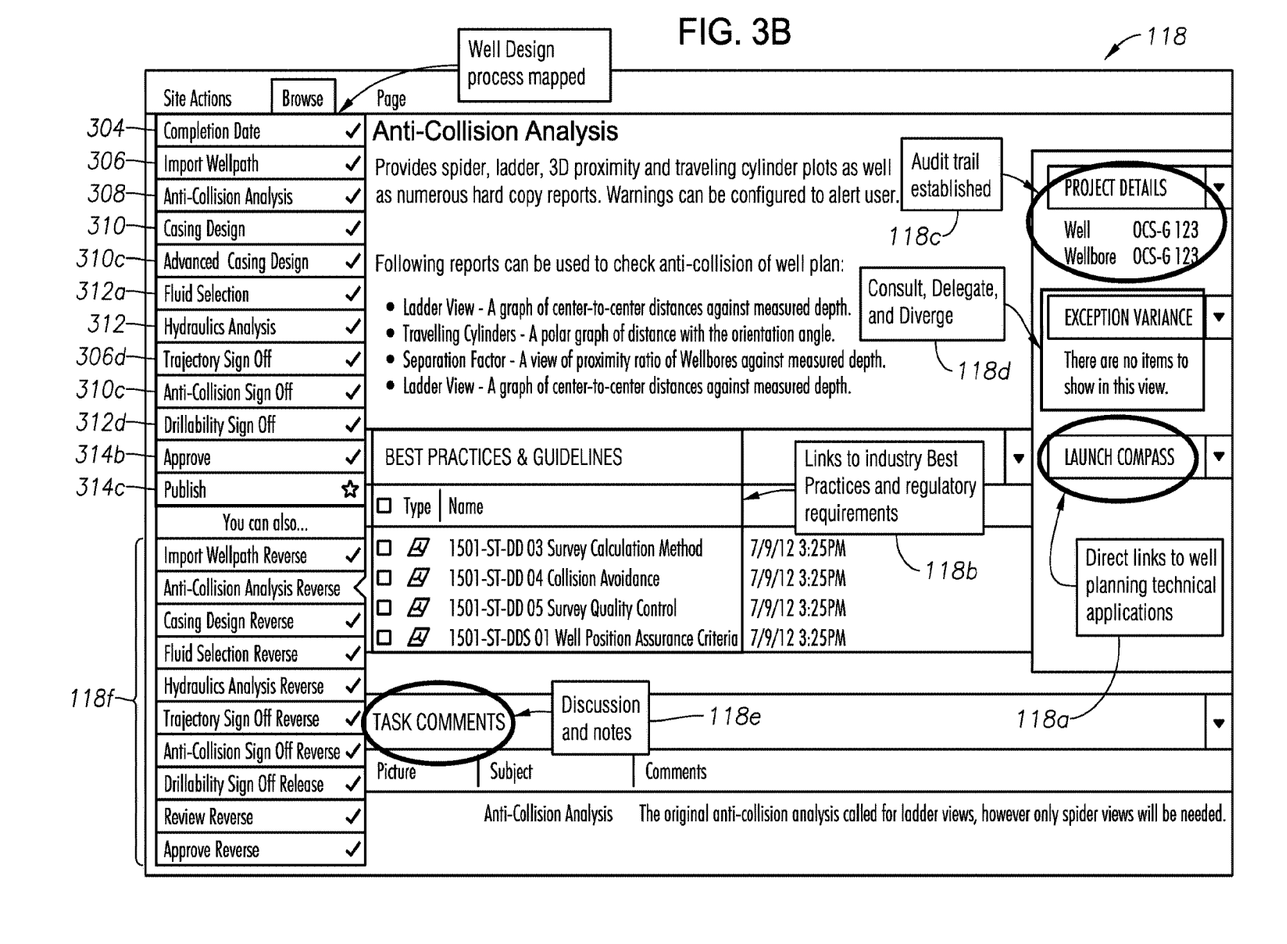

With reference to FIGS. 3A and 3B, an exemplary well planning work flow will now be described. FIG. 3A illustrates a well planning workflow 300 performed by workflow management system 100 according to an exemplary methodology of the present invention. FIG. 3B illustrates a display shown via user interface 118 during workflow 300 according to an exemplary embodiment of the present invention. To initiate well planning workflow 300 at step 302, a user (e.g., engineer) logs onto workflow management system 100 via the appropriate interfaces such as, for example, a client drilling portal or intranet. At step 304, the completion date for the wellbore is entered. At step 306, the desired well path is entered by way of importation from local or remote memory (step 306b), technical applications module 112, creation (step 306a), or some other suitable location. The well path includes, for example, the actual or planned trajectory of the wellbore as defined by Cartesian coordinates and angular orientation/properties, in addition to other wellbore characteristics such as, for example, the casing design. If the creation option is chosen, workflow management application 100 will display a graphical user interface that allows the entry of design specifications for the well.

At step 306c, workflow management system 100 determines whether the well path was imported or created, being that either is allowed. Thereafter, workflow management system 100 advances on to step 306d where it determines whether the well path has been entered at step 306. If the determination is "yes," authorized personnel are then allowed to review and sign off on the recorded well path. If the determination is "no," authorized personnel are prevented from signing off on the well path until the well path has been entered. In this exemplary embodiment, in order to sign off, the authorized personnel must log onto workflow management system 100 and enter the appropriate stage in the workflow, whereby the entry is then recorded by workflow management system 100.

In the exemplary embodiments of the present invention, workflow management system 100 provides the ability to apply certain authorization levels to users. As such, authorized personnel are those individuals who have been recorded within workflow management system 100 as having certain authorization clearances. Such authority may be given based upon technical expertise, experience levels, job functions, etc. Moreover, if workflow management system 100 comes to a point along workflow 300 where the current user is not authorized, workflow management system 100 may generate a list of authorized personnel for the particular function. In an alternative exemplary embodiment, such authorized personnel receives a notification from workflow management system 100 that their expertise is need at a particular stage of the workflow.

After step 306, workflow management system 100 also allows advancement to the anti-collision analysis of step 308. Here, workflow management system 100, via the processor and technical applications module 112, analyzes the well path data using a variety of engineering/technical applications (such as those described herein) to ensure the well path is viable. In addition, data modeling model 112 continues to track and analyze the data throughout workflow 300. As a result, workflow management system 100 will lead the user through workflow 300 while also invoking the appropriate engineering/technical application at the requisite points along the workflow. As previously described, exemplary engineering/technical applications include the Engineer's Data Model™ or Engineer's Desktop™ application suite. Referring to FIG. 3B, window 118a illustrates how a direct link to well planning technical applications may also be provided.

In addition, document management module 116 also tracks and analyzes the data throughout workflow 300 in order to provide the user with access to relevant data, such as, for example, websites, technical papers, etc., related to the specific workflow stage or as needed by the user. Such relevant data may also include Best Practice Guidelines or evidence documents used to indicate whether personnel have completed certain workflow steps. Such evidence documentation may also take the form of output reports of engineering analysis conducted by technical applications module 112. Referring to FIG. 3B, window 118b illustrates this exemplary feature in that a link to relevant best practices data, regulator requirements, evidence documentation, etc. is provided.

At step 308, workflow management system 100 conducts an anti-collision analysis of the well path entered at step 306. Here, as illustrated in FIG. 3B, utilizing technical applications module 112, workflow management system 100 will analyze the well path design specifications to ensure there is no well path convergence. Moreover, during the anti-collision analysis, workflow management system 100 may provide spider, ladder, 3D proximity and traveling cylinder plots, as well as hard copy reports. Anti-collision scans may be run interactively along with planning, surveying or future projections. Workflow management system 100 may also allow configuration of warnings to alert a user when well paths converge or are predicted to converge based on specified criteria, or when other specified events happen or are predicted to happen along workflow 300. In addition, nearby wells may be selected and analyzed in conjunction with the anti-collision analysis. Furthermore, workflow management system 100 utilizes a variety of plots and reports received via technical applications module 112 to perform the anti-collision analysis such as, for example, ladder view, traveling cylinders, separation factor, 3D proximity view, spider view and wellbore tracks.

Still referring to the exemplary embodiments of FIGS. 3A & 3B, at step 310a, workflow management system 100 provides the user with the option of performing the casing analysis of step 310 and signing off on the anti-collision analysis at step 310c. Note, however, that workflow management system 100 will not allow sign off on the collision analysis at step 310c until the anti-collision analysis has been completed at step 308.

Nevertheless, at step 310, workflow management system 100 analyzes the casing design utilizing technical applications module 112. At step 310b, workflow management system 100 provides for the optional selection of the casing depths, as well as the requiring entry of the casing design at step 310b. Once entered, workflow management system 100, via technical applications module 112, models and analyzes the casing design at step 310c, where pressure, temperature, loads and stresses are analyzed. A second advance casing design analysis may then be conducted by workflow management system 100 at step 310d, which further refines the original design. However, before the advanced casing analysis of step 310d, workflow management system 100 must first determine that the casing design analysis of step 310c has been completed. Once workflow management system 100 determines the casing analysis of step 310c has been conducted, only then will workflow 300 advances to step 310d.

Thereafter, at step 310e, workflow management system 100 determines whether the advance casing design analysis of step 310d has been performed. If the determination is "yes," workflow management system 100 will then allow the appropriate personnel to sign off on the casing design. If, however, the determination is "no," workflow management system 100 will not allow advancement onto the next step in workflow 300.

At step 312, workflow management system 100, via technical applications module 112, then performs a drillability analysis of the well as designed up to this stage in workflow 300. The drillability analysis includes a fluid selection entry at step 312a. Here, fluids may be entered, for example, as water based, oil based or a combination of the two. Fluid selection may also be determined based upon the formation characteristics, design parameters or user preference. In addition, the drillability analysis includes a torque and drag analysis at step 312*b*, which assures the integrity of the drill string and rate of penetration ("ROP") are maintained.

After the fluid selection of 312*a*, a hydraulics analysis is then conducted at step 312*c* only if workflow management system 100 first determines that the fluid selection analysis has been conducted. The hydraulics analysis is conducted to maintain hole cleaning and Equivalent Circulating Density ("ECD") to prevent stuck pipe events. If workflow management system 100 determines that the fluid selection has not been entered at step 312*a*, step 312*c* will not be performed. Thereafter, at step 312*d*, workflow management system 100 must again determine whether step 312*c* has been completed. If it has, authorized personnel are allowed to sign off on the drillability analysis, thereby allowing the system to progress to the next step.

Still referring to the exemplary embodiments of FIGS. 3A & 3B, at step 314 the well plan is finalized. At step 314*a*, the well plan is reviewed by authorized personnel, and workflow management system 100 determines whether it is approved at step 314*b*. In order to make the determination of step 314*b*, workflow management system 100 must determine whether the review of step 314*a* has been completed by an authorized user. If the determination is "yes," workflow management system 100 allows approval of the well design by an authorized user. If, however, workflow management system 100 determines that there has been no review at step 314*a*, the approval step of 314*b* is not allowed. Once approval of step 314*b* has been completed, workflow management system 100 will then publish (i.e., output) the well plan at step 314*c*. Exemplary forms of publishing or outputting the well plan include, for example, displayed via a display screen in a textual report, earth model, etc., storage in a computer readable medium, etc.

Referring to FIG. 3B, there are a variety of other functions provided by exemplary embodiments of workflow management system 100. Workflow management system 100 also comprises an auditing capability that records alterations to well designs and other workflows (i.e., change events), the impact of such alterations, why the alteration was made, the severity of the alteration, as well as who made and/or authorized such alterations, as shown in window 118*c*. Moreover, workflow management system 100 may also produce an audit trail of change events such as, for example, decisions (e.g., approvals, disapprovals, etc.), notifications to desired personnel or deviations made. The auditing feature can also track an individual user's performance including, for example, the amount of time it took that user to conduct a task.

Workflow management system 100 also provides the ability for users to consult with other personnel, delegate responsibilities and/or diverge wellplans, and to track such actions, as shown in window 118*d*. Moreover, utilizing workflow engine module 114, workflow management system 100 allows generation of new workflows or modification of existing ones at will per desired requirements. A discussion and notes window 118*e* is also provided whereby users can interact with one another during the workflow process. In addition to capturing and analyzing data during the workflow process, workflow management system 100 may also monitor real-time data (e.g., drilling data) in order to provide a deeper understanding of operations and decisions, and to ensure expected conditions modeled by the workflow management system 100 are within predetermined ranges of expectation.

Also, workflow management system 100 provides the capability to perform a reverse analysis, or recalculation, of various well paths along workflow 300, as denoted by the "R" in FIG. 3A and window 118*f* in FIG. 3B. More specifically, the feature allows a user, at any point along workflow 300, to go back to any of the recalculation-allowed steps, and re-perform the workflow. For example, if at step 310*d* in workflow 300, the user may return back to step 306 and alter the well path. In response, workflow management system 100 will recalculate all subsequent steps based on the data entered in each respective step. Also, as would be understood by those ordinarily skilled in the art having the benefit of this disclosure, workflow management system 100 may automatically perform, via technical applications module 112, all necessary remodeling/re-analysis of the well design without requiring user intervention. In this exemplary embodiment, the workflow steps eligible for recalculation include import well path, anti-collision analysis, casing design, fluid selection, hydraulics analysis, torque and drag analysis, trajectory sign off, anti-collision sign off, casing design sign off, drillability sign off, review and approve.

Accordingly, the exemplary embodiments of the present invention provide a well planning workflow tool that integrates engineering applications and best practice documentation at all points along the workflow process. Users are allowed to design workflows at will, configure activity pages and component layouts, and map personnel to certain roles based on authorization levels. Managers and team leads can monitor the progress on key engineering projects, since all steps of workflow are audited and recorded. In addition, technical personnel will be provided with a flexible yet enforced workflow to ensure that all planning steps are conducted. In addition, the personnel will know the next step in the planning process, and be provided with a central repository with links at the appropriate steps in the workflow for reference. Accordingly, oil and gas companies can ensure that the correct procedures have been followed and documented.

The foregoing methods and systems described herein are particularly useful in planning and drilling wellbores. As described, the system integrates a well planning platform with technical applications such that a well planning workflow is created through an analysis of wellbore characteristics. Accordingly, based on the analyzed wellbore characteristics, a well planning workflow is created. Thereafter, well equipment is identified and the prepared based upon the well planning workflow, and the wellbore is drilled and completed in accordance to the well planning workflow.

Those of ordinary skilled in the art will appreciate that while exemplary embodiments and methodologies of the present invention have been described statically as part of implementation of a well planning workflow, the methods may also be implemented dynamically. Thus, a well plan may be implemented and data from the well planning workflow may be used to update the well plan for the drilling of wellbores. After implementing the well plan, the system of the invention may be utilized during the completion process on the fly or iteratively to predict wellbore events as parameters change or are clarified or adjusted. In either case, the results of the dynamic calculations may be utilized to alter a previously implemented well plan.

In view of the foregoing, an exemplary embodiment of the present invention provides a computer-implemented method to create a well planning workflow for a wellbore, the method comprising receiving one or more characteristics of the wellbore, analyzing the one or more characteristics of the wellbore using a technical applications module, and outputting the well planning workflow based upon the analysis of the one or more characteristics of the wellbore. In an alternative methodology, receiving the one or more characteristics of the wellbore comprises receiving at least one of well path data, casing design data, or a fluid selection data for the wellbore. In yet another, analyzing the one or more characteristics of the wellbore comprises performing at least one of a anti-collision, casing design or drillability analysis of the wellbore using the technical applications module. In another, performing the drillability analysis comprises performing at least one of a hydraulic analysis or torque and drag analysis of the wellbore using the technical applications module.

In yet another methodology, the method further comprises integrating at least one of a best practices data, technical journal or evidence document at relevant stages along the well planning workflow. In another, the method further comprises receiving one or more altered characteristics of the wellbore and analyzing the one or more altered characteristics of the wellbore using the technical applications module, wherein the outputted well planning workflow is based upon the analysis of the one or more altered characteristics of the wellbore. In yet another, the system generates an audit trail of change events occurring during the creation of the well planning workflow. In yet another, the method comprises assigning authorization levels to users participating in the well planning workflow. In another, the outputted well planning workflow is utilized to complete the wellbore.

An exemplary system of the present invention provides a system for creating a well planning workflow for a wellbore, the system comprising a user interface and a workflow management application to receive one or more characteristics of the wellbore through utilization of the user interface, the workflow management application comprising a technical applications module that analyzes the one or more characteristics of the wellbore, wherein the workflow management application outputs the well planning workflow based upon the analysis of the one or more characteristics of the wellbore. In yet another, the technical applications module analyzes at least one of well path data, casing design data, or a fluid selection data for the wellbore. In another, the technical applications module performs at least one of an anti-collision, casing design or drillability analysis of the wellbore. In yet another, the drillability analysis comprises performing at least one of a hydraulic analysis or torque and drag analysis of the wellbore.

In another exemplary embodiment, the system further comprises a document management module that integrates at least one of a best practices data, technical journal or evidence document at relevant stages along the well planning workflow. In yet another, the workflow management application receives one or more altered characteristics of the wellbore, and the technical applications module analyzes the one or more altered characteristics of the wellbore, wherein the outputted well planning workflow is based upon the analysis of the one or more altered characteristics of the wellbore. In another, the workflow management application generates an audit trail of change events occurring during the creation of the well planning workflow. In yet another, the workflow management application allows authorization levels to be assigned to users participating in the well planning workflow. In another, the outputted well planning workflow is utilized to complete the wellbore.

Yet another exemplary embodiment of the present invention provides a computer program product comprising instructions to create a well planning workflow for a wellbore, the instructions which, when executed by at least one processor, causes the processor to perform any of the methods described herein. In addition, another exemplary embodiment of the present invention provides a system for creating a well planning workflow for a wellbore, the system comprising a processor and a memory operably connected to the processor, the memory comprising software instructions stored thereon that, when executed by the processor, causes the processor to perform a method comprising receiving one or more characteristics of the wellbore, analyzing the one or more characteristics of the wellbore using a technical applications module, and outputting the well planning workflow based upon the analysis of the one or more characteristics of the wellbore.

Accordingly, exemplary embodiments of the present invention provide a well planning workflow tool that integrates technical engineering applications and best practice documentation at any point along the workflow process. Thereafter, wellbores are drilled and/or existing planned wellbores are altered based upon the well planning workflow tool, thus allowing the planning, management and monitoring of workflows in a collaborative environment.

Although various embodiments and methodologies have been shown and described, the invention is not limited to such embodiments and methodologies and will be understood to include all modifications and variations as would be apparent to one skilled in the art. Therefore, it should be understood that the invention is not intended to be limited to the particular forms disclosed. Rather, the intention is to cover all modifications, equivalents and alternatives falling within the spirit and scope of the invention as defined by the appended claims.

What is claimed is:

1. A computer-implemented method of well planning, the method comprising:
   receiving, by a computer system via a network, one or more characteristics of a wellbore to be drilled within a formation;
   analyzing, by the computer system, the one or more characteristics of the wellbore using a technical applications module;
   outputting, by the computer system, a well planning workflow for the wellbore based upon the analysis of the one or more characteristics of the wellbore;
   drilling the wellbore along a planned path within the formation in accordance with the well planning workflow;
   generating an audit trail of change events occurring during the drilling of the wellbore; and
   updating the planned path of the wellbore as the wellbore is drilled, based on the audit trail.

2. A computer-implemented method as defined in claim 1, wherein receiving the one or more characteristics of the wellbore comprises receiving at least one of well path data, casing design data, or a fluid selection data for the wellbore.

3. A computer-implemented method as defined in claim 1, wherein analyzing the one or more characteristics of the wellbore comprises performing at least one of a anti-collision, casing design or drillability analysis of the wellbore using the technical applications module.

4. A computer-implemented method as defined in claim 3, wherein performing the drillability analysis comprises performing at least one of a hydraulic analysis or torque and drag analysis of the wellbore using the technical applications module.

5. A computer-implemented method as defined in claim 1, further comprising integrating at least one of a best practices data, technical journal or evidence document at relevant stages along the well planning workflow.

6. A computer-implemented method as defined in claim 1, further comprising:
receiving one or more altered characteristics of the wellbore; and
analyzing the one or more altered characteristics of the wellbore using the technical applications module, wherein the outputted well planning workflow is based upon the analysis of the one or more altered characteristics of the wellbore.

7. A computer-implemented method as defined in claim 1, wherein the audit trail includes a record of the change events occurring during the drilling of the wellbore and the creation of the well planning workflow.

8. A computer-implemented method as defined in claim 1, further comprising assigning authorization levels to users participating in the well planning workflow.

9. A computer-implemented method as defined in claim 1, wherein the outputted well planning workflow is utilized to complete the wellbore.

10. A system comprising:
a processor; and
a memory operably connected to the processor, the memory comprising software instructions stored thereon that, when executed by the processor, causes the processor to perform a plurality of functions, including functions to:
receive one or more characteristics of a wellbore to be drilled within a formation;
analyze the one or more characteristics of the wellbore using a technical applications module;
output the well planning workflow based upon the analysis of the one or more characteristics of the wellbore;
drill the wellbore along a planned path within the formation in accordance with the well planning workflow;
generate an audit trail of change events occurring during the drilling of the wellbore; and
update the planned path of the wellbore as the wellbore is drilled, based on the audit trail.

11. A system as defined in claim 10, wherein the technical applications module analyzes at least one of well path data, casing design data, or a fluid selection data for the wellbore.

12. A system as defined in claim 10, wherein the technical applications module performs at least one of an anti-collision, casing design or drillability analysis of the wellbore.

13. A system as defined in claim 12, wherein the drillability analysis comprises performing at least one of a hydraulic analysis or torque and drag analysis of the wellbore.

14. A system as defined in claim 10, wherein the analysis of the one or more characteristics of the wellbore integrates at least one of a best practices data, technical journal or evidence document at relevant stages along the well planning workflow.

15. A system as defined in claim 10,
wherein the functions performed by the processor further include functions to:
receive one or more altered characteristics of the wellbore; and
analyze the one or more altered characteristics of the wellbore, and
wherein the outputted well planning workflow is based upon the analysis of the one or more altered characteristics of the wellbore.

16. A system as defined in claim 10, wherein the audit trail includes a record of the change events occurring during the drilling of the wellbore and the creation of the well planning workflow.

17. A system as defined in claim 10, wherein the functions performed by the processor further include functions to assign authorization levels to users participating in the well planning workflow.

18. A system as defined in claim 10, wherein the outputted well planning workflow is utilized to complete the wellbore.

19. A non-transitory computer-readable medium comprising instructions, which, when executed by at least one processor, causes the processor to perform a plurality of functions, including functions to:
receive one or more characteristics of the wellbore;
analyze the one or more characteristics of the wellbore using a technical applications module;
output the well planning workflow based upon the analysis of the one or more characteristics of the wellbore;
drill the wellbore along a planned path within the formation in accordance with the well planning workflow;
generate an audit trail of change events occurring during the drilling of the wellbore; and
update the planned path of the wellbore as the wellbore is drilled, based on the audit trail.

20. A non-transitory computer-readable medium as defined in claim 19, wherein the one or more characteristics of the wellbore include at least one of well path data, casing design data, or a fluid selection data for the wellbore.

21. A non-transitory computer-readable medium as defined in claim 19, wherein the analysis of the one or more characteristics of the wellbore includes at least one of a anti-collision, casing design or drillability analysis of the wellbore using the technical applications module.

22. A non-transitory computer-readable medium as defined in claim 21, wherein the drillability analysis comprises performing at least one of a hydraulic analysis or torque and drag analysis of the wellbore using the technical applications module.

23. A non-transitory computer-readable medium as defined in claim 19, wherein the analysis of the one or more characteristics of the wellbore integrates at least one of a best practices data, technical journal or evidence document at relevant stages along the well planning workflow.

24. A non-transitory computer-readable medium as defined in claim 19, wherein the functions performed by the processor further include functions to:
receive one or more altered characteristics of the wellbore; and
analyze the one or more altered characteristics of the wellbore using the technical applications module, wherein the outputted well planning workflow is based upon the analysis of the one or more altered characteristics of the wellbore.

25. A non-transitory computer-readable medium as defined in claim 19, wherein the audit trail includes a record of the change events occurring during the drilling of the wellbore and the creation of the well planning workflow.

26. A non-transitory computer-readable medium as defined in claim 19, wherein the functions performed by the processor further include functions to assign authorization levels to users participating in the well planning workflow.

27. A non-transitory computer-readable medium as defined in claim 19, wherein the outputted well planning workflow is utilized to complete the wellbore.

* * * * *